(12) United States Patent
Maki (10) Patent No.: US 10,288,030 B2
(45) Date of Patent: May 14, 2019

(54) ENGINE, SELF-STARTER UNIT, AND METHOD FOR ALTERING ENGINE SPECIFICATIONS

(71) Applicant: Mitsubishi Heavy Industries Meiki Engines Co., Ltd., Nagoya-shi, Aichi (JP)

(72) Inventor: Kazuhiro Maki, Tokyo (JP)

(73) Assignee: Mitsubishi Heavy Industries Meiki Engines, Co., Ltd., Nagoya-shi, Aichi (JP)

( * ) Notice: Subject to any disclaimer, the term of this patent is extended or adjusted under 35 U.S.C. 154(b) by 71 days.

(21) Appl. No.: 15/521,876

(22) PCT Filed: Oct. 29, 2015

(86) PCT No.: PCT/JP2015/080597
§ 371 (c)(1),
(2) Date: Nov. 3, 2017

(87) PCT Pub. No.: WO2016/068253
PCT Pub. Date: May 6, 2016

(65) Prior Publication Data
US 2018/0045160 A1    Feb. 15, 2018

(30) Foreign Application Priority Data

Oct. 29, 2014   (JP) ................. 2014-219908

(51) Int. Cl.
*F02N 11/08*    (2006.01)
*F02N 3/02*    (2006.01)
(Continued)

(52) U.S. Cl.
CPC ............ *F02N 11/0862* (2013.01); *F01P 1/06* (2013.01); *F02B 67/00* (2013.01); *F02N 3/02* (2013.01);
(Continued)

(58) Field of Classification Search
CPC ...... F02N 11/00; F02N 11/08; F02N 11/0862; F02N 11/087; F02N 3/02; F01P 1/06; F02B 67/00
See application file for complete search history.

(56) References Cited

U.S. PATENT DOCUMENTS 6,199,529 B1    3/2001   Kuwabara et al.
6,363,901 B1    4/2002   Watanabe et al.
(Continued)

FOREIGN PATENT DOCUMENTS

CN    201386591 Y    1/2010
CN    203022881 U    6/2013
(Continued)

OTHER PUBLICATIONS

International Search Report, App. No. PCT/JP2015/080597, dated Jan. 12, 2016, 4 Pages.
(Continued)

*Primary Examiner* — Grant Moubry
(74) *Attorney, Agent, or Firm* — Berkeley Law & Technology Group, LLP (57) ABSTRACT

An engine is equipped with a starter motor which is attached to an engine main body and is configured to perform cranking of a crankshaft. The engine is further equipped with a battery pack (37). The battery pack is equipped with a lithium-based cell which is attached to the engine main body and which is configured to supply electric power which drives the starter motor.

6 Claims, 6 Drawing Sheets

(51) Int. Cl.
*F01P 1/06* (2006.01)
*F02N 11/00* (2006.01)
*F02B 67/00* (2006.01)

(52) U.S. Cl.
CPC .............. *F02N 11/00* (2013.01); *F02N 11/08* (2013.01); *F02N 11/087* (2013.01)

(56) References Cited

U.S. PATENT DOCUMENTS

| | | | | |
|---|---|---|---|---|
| 7,989,969 | B2* | 8/2011 | Grant | F02B 63/04 |
| | | | | 290/1 A |
| 8,174,140 | B2* | 5/2012 | Kanai | F02B 63/04 |
| | | | | 290/47 |
| 8,319,357 | B2* | 11/2012 | Usselman | F02B 63/04 |
| | | | | 290/1 A |
| 9,190,861 | B2* | 11/2015 | Kim | H02J 7/007 |
| 2002/0078914 | A1 | 6/2002 | Manabe et al. | |
| 2004/0090071 | A1* | 5/2004 | Blackburn | F02N 11/04 |
| | | | | 290/35 |
| 2006/0027201 | A1 | 2/2006 | Ono | |
| 2006/0087280 | A1 | 4/2006 | Miyashita et al. | |
| 2014/0299089 | A1 | 10/2014 | Koenen et al. | |
| 2017/0126057 | A1* | 5/2017 | Jenison | F02B 63/04 |

FOREIGN PATENT DOCUMENTS

| | | | |
|---|---|---|---|
| JP | 59016507 | Y | 5/1984 |
| JP | 59162362 | A | 9/1984 |
| JP | 02248652 | A | 10/1990 |
| JP | 02248653 | A | 10/1990 |
| JP | 11117835 | A | 4/1999 |
| JP | 11280626 | A | 10/1999 |
| JP | 2005076457 | A | 3/2005 |
| JP | 3948210 | B2 | 7/2007 |
| JP | 4138455 | B2 | 8/2008 |
| JP | 4549258 | B2 | 9/2010 |
| JP | 2013151862 | A | 8/2013 |
| JP | 2014058906 | A | 4/2014 |
| JP | 2014066198 | A | 4/2014 |
| JP | 2014148966 | A | 8/2014 |
| JP | 2014196720 | A | 10/2014 |
| TW | 200617277 | A | 6/2006 |
| WO | 2013111587 | A2 | 8/2013 |

OTHER PUBLICATIONS

Written Opinion of the International Searching Authority, App. No. PCT/JP2015/080597, dated Jan. 12, 2016, 9 Pages.

* cited by examiner

| SELF-STARTER UNIT ATTACHING PROCESS | ~S01 |

ENGINE, SELF-STARTER UNIT, AND METHOD FOR ALTERING ENGINE SPECIFICATIONS

TECHNICAL FIELD

The present invention relates to an engine, a self-starter unit, and a method for altering engine specifications.

The present application claims priority based on Japanese Patent Application No. 2014-219908 filed on Oct. 29, 2014, the contents of which are incorporated herein by reference.

BACKGROUND ART

A so-called general-purpose engine used for agricultural working machines and the like often includes a so-called recoil starter which performs cranking by pulling a rope. Since this recoil starter needs to vigorously and greatly pull the rope, there are cases in which a starting manipulation of an engine becomes a burden on elderly users or the like.

In automobiles and the like, a self-starter is mounted for starting the engine. When the self-starter is used in this way, the engine can be easily started with only a switch manipulation. As a power supply of the self-starter, in many cases, a lead storage battery is used in terms of maintenance and capacity. The lead storage battery used to start the engine is generally large and heavy. Although there is no problem when an installation space is sufficient as in a vehicle such as an automobile, there are cases in which it is difficult to install the lead storage battery in terms of weight increase or securing of the installation space when trying to install the lead storage battery in an agricultural working machine or the like.

Patent Document 1 suggests a technique for reducing a burden on a user caused at the time of starting an engine of a working machine or the like. In Patent Document 1, a self-starter that performs cranking using the power of an electric motor is added to a small engine, and a battery pack made of a lithium secondary battery is housed in a switch box provided at a different position from the small engine.

RELATED ART DOCUMENT

Patent Document

Patent Document 1: Japanese Patent No. 4549258

SUMMARY

Problems to be Solved by the Invention

In the technique described in Patent Document 1, a battery pack is housed in a switch box installed on a handlebar of a working machine, which is a location separate from an engine main body of a small engine. Therefore, the size of the switch box increases by an amount corresponding to the housing space of the battery pack, and the weight of the switch box increases. As a result, there is a possibility that adverse influences such as degradation of operability of the handlebar may occur.

An object of the present invention is to provide an engine, a self-starter unit, and a method for altering engine specifications in which the engine can be easily started and degradation of operability accompanied with an increase in the size or an increase in weight of a device driven by an engine output can be suppressed.

Means for Solving the Problem

According to a first aspect of the present invention, an engine is equipped with a starter motor which is attached to an engine main body and is configured to perform cranking of a crankshaft. The engine further includes a battery pack equipped with a lithium-based cell which is attached to the engine main body and which is configured to supply electric power which drives the starter motor.

With such a configuration, the engine can be started by the starter motor, and there is no need to install a power supply driving the starter motor in a device such as a working machine on which the engine is mounted. By using a lithium-based cell, the size of the battery necessary to drive the starter motor can be set to be smaller than when a lead storage battery is used. Therefore, it is possible to miniaturize the battery pack and to easily attach the battery pack to a dead space or the like of the engine main body. As a result, it is possible to easily start the engine, and it is possible to suppress degradation of operability accompanied with an increase in the size and weight of the device driven by the engine output.

According to a second aspect of the present invention, in the engine according to the first aspect, a fan configured to supply cooling air to a cylinder portion of the engine main body may be disposed on a first side of a crankcase of the engine main body in an axial direction of the crankshaft. The starter motor may be disposed on a second side of the crankcase. The starter motor and the lithium-based cell may be disposed on an opposite side of the cylinder portion across an axis of the crankshaft.

With this configuration, it is possible to dispose the battery pack at the farthest position from the cylinder having the highest temperature in the engine main body. Along with the battery pack, the starter motor can also be disposed at the farthest position from the cylinder portion. Therefore, it is possible to suppress a temperature increase of the starter motor or the battery pack. Further, it is possible to shorten the wiring through which a large current flows between the starter motor and the battery pack, thereby reducing the resistance due to the wiring. As a result, it is possible to reduce the burden on the starter motor or the lithium-based cell, and to stably drive the starter motor with high efficiency.

According to a third aspect of the present invention, in the engine, the battery pack according to the second aspect may be attached to a fan cover that covers the fan.

The fan cover which covers the fan that sends the cooling air to the cylinder serves as a passage of outside air to be taken in by the fan. Therefore, the temperature becomes relatively lower than in other places in the engine main body. As a result, the temperature increase of the battery pack can be further suppressed.

According to a fourth aspect of the present invention, in the engine according to any one of the first to third aspects, the engine may further include a switch unit which is attached to the engine main body and is configured to perform a starting manipulation of the engine main body, and the battery pack may be disposed below the switch unit.

With this configuration, it is possible to effectively utilize the space below the switch unit attached to the engine main body.

According to a fifth aspect of the present invention, in the engine, the battery pack according to any one of the first to fourth aspects may be attached to the engine main body via a bracket.

With this configuration, the battery pack can be attached to and detached from the engine main body by simply attaching and detaching the bracket to and from the engine main body. As a result, the battery pack can be easily attached to and detached from the engine main body at the time of assembly or maintenance.

According to a sixth aspect of the present invention, in the engine, the switch unit and the battery pack according to the fifth aspect may be attached to the engine main body via a single bracket.

With such a configuration, the switch unit and the battery pack can be integrally attached to the engine main body. For example, when the switch unit is attached to the engine main body via the bracket, the bracket for the switch unit can be used as a bracket for attaching the battery pack to the engine main body.

According to a seventh aspect of the present invention, the engine may further include a control unit which performs energization from the battery pack to the starter motor, only when the starter motor according to any one of the first to sixth aspects performs cranking.

With such a configuration, it is possible to suppress discharge from the battery pack when the starter motor does not perform cranking. When the battery pack is charged from the generator of the engine main body, the charging efficiency can be improved.

According to an eighth aspect of the present invention, a self-starter unit includes a starter motor which performs cranking of an engine. The self-starter unit further includes a battery pack equipped with a lithium-based cell which is attached to the engine and is configured to supply electric power to the starter motor. The self-starter unit further includes a control unit which controls electric power supply from the battery pack to the starter motor.

By attaching the self-starter unit to the engine main body, it is possible to easily start the engine, and it is possible to suppress degradation of operability accompanied with an increase in the size or weight of the device driven by the engine output.

According to a ninth aspect of the present invention, in the self-starter unit, the control unit in the eighth aspect may perform energization from the battery pack to the starter motor only when the starter motor performs cranking.

With such a configuration, it is possible to suppress discharge from the battery pack when the starter motor does not perform cranking. When the battery pack is charged from the generator mounted on the engine main body, its charging efficiency can be improved.

According to a tenth aspect of the present invention, there is provided a method for altering engine specifications, the method including attaching the self-starter unit of the eighth or ninth aspect to an engine having a recoil starter.

For example, a self-starter unit including a battery pack is attached to an engine having only a recoil starter as a starting device. As a result, the cranking function of the starter motor can be added to the engine, without securing a space for installing the battery pack on the device side operated by the engine output. As a result, it is possible to easily start the engine in a normal state while maintaining the recoil starter as an emergency starting device.

Advantage of the Invention

According to the engine, the self-starter unit, and the method for altering engine specifications, it is possible to easily start the engine and to suppress the degradation of the operability accompanied with an increase in size or an increase in weight of the device driven by the engine output.

DESCRIPTION OF THE EMBODIMENTS

Embodiments

Hereinafter, an engine, a self-starter unit, and a method for altering engine specifications according to an embodiment of the present invention will be described.

Figure 1:
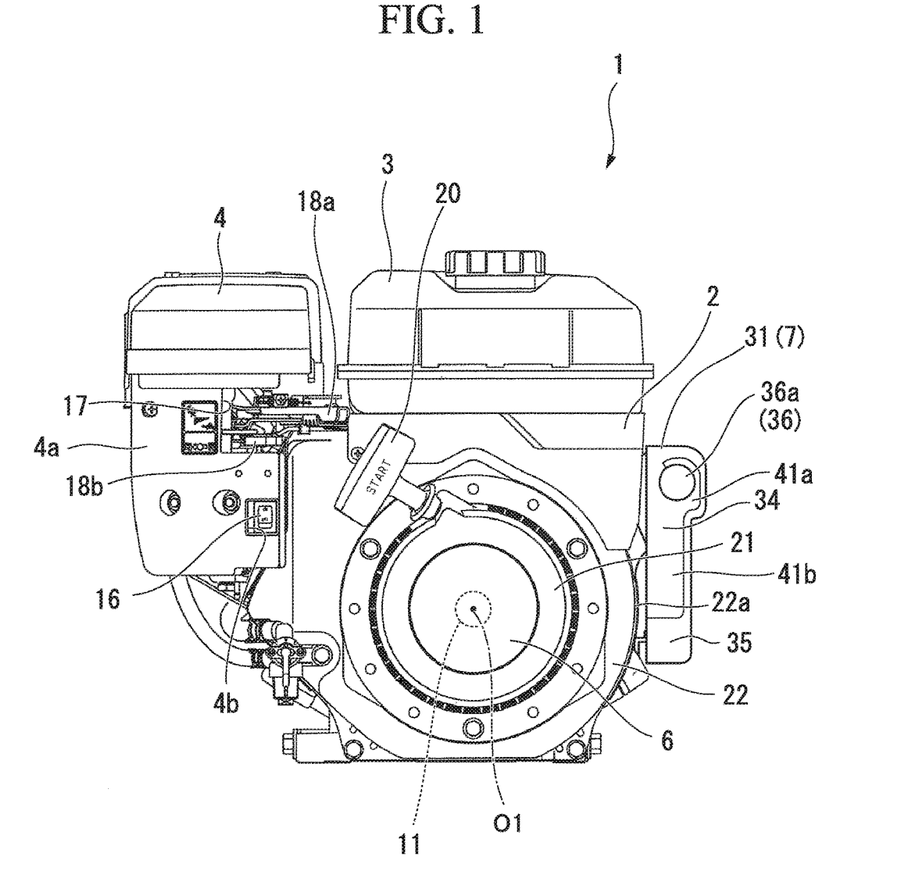
FIG. 1 is a front view of an engine according to an embodiment of the present invention.
Figure 2:
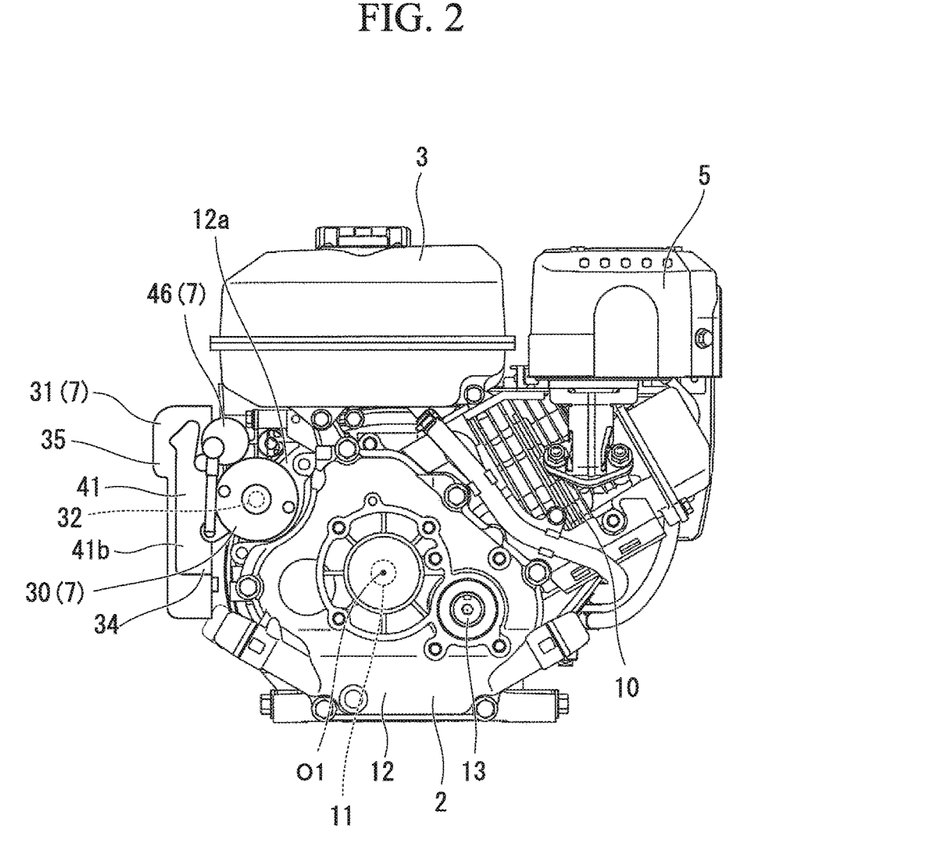
FIG. 2 is a rear view of the engine according to the embodiment of the present invention.
Figure 3:
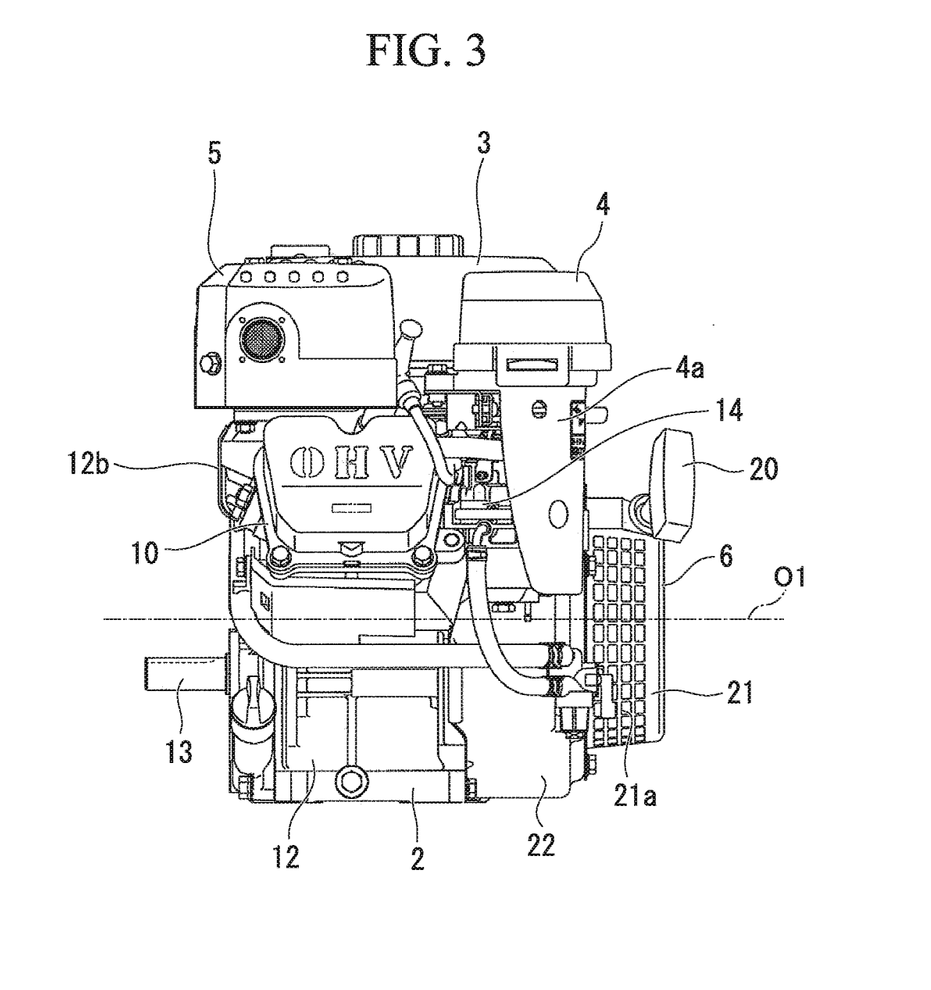
FIG. 3 is a left side view of the engine according to the embodiment of the present invention.
Figure 4:
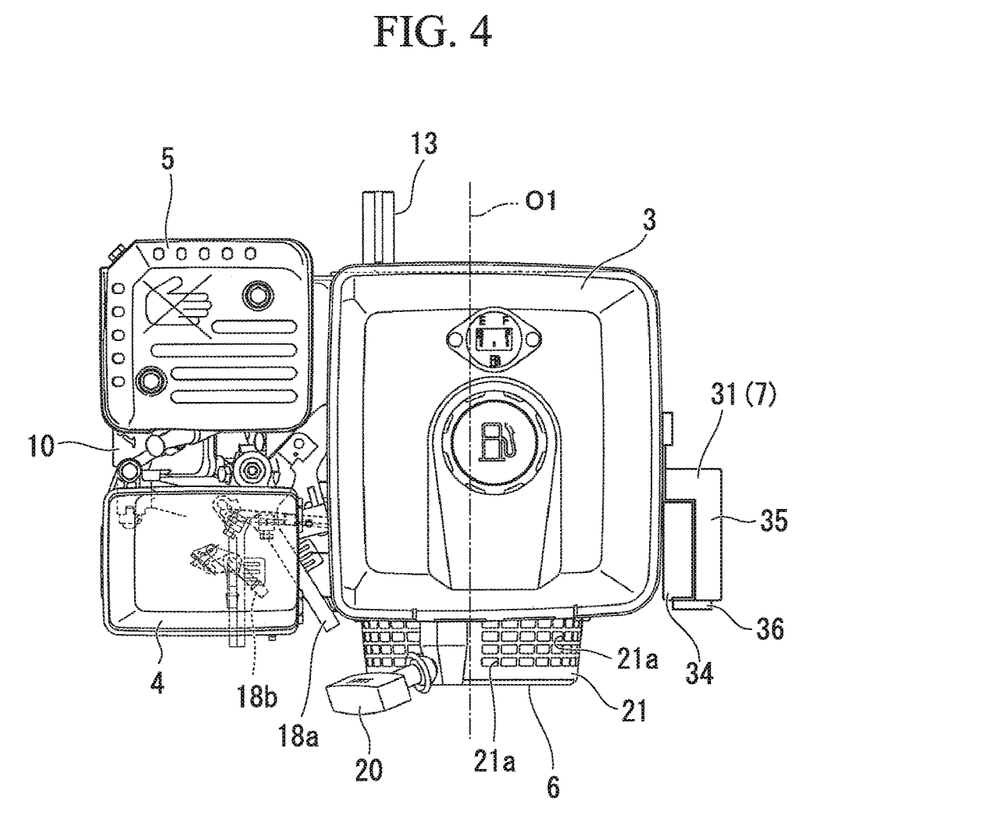
FIG. 4 is a top view of an engine according to an embodiment of the present invention.

FIG. 1 is a front view of an engine according to an embodiment of the present invention. FIG. 2 is a rear view of the engine according to the embodiment of the present invention. FIG. 3 is a left side view of the engine according to the embodiment of the present invention. FIG. 4 is a top view of an engine according to an embodiment of the present invention.

An engine 1 of this embodiment is a so-called general-purpose engine. The engine 1 is, for example, a single cylinder air-cooled four-stroke engine used as a driving source of an agricultural working machine or the like.

As shown in FIGS. 1 to 4, the engine 1 mainly includes an engine main body 2, a fuel tank 3, an air cleaner box 4, a muffler 5, a recoil starter 6, and a self-starter unit 7.

A cylinder portion 10 of the engine main body 2 extends toward a radial outer side of a crankshaft 11. The cylinder portion 10 is provided to be inclined laterally with respect to a crankcase portion 12. The fuel tank 3 for storing fuel is disposed above the crankcase portion 12. An output shaft 13 is exposed on the rear side of the engine main body 2 in the embodiment. The output shaft 13 is linked to the crankshaft 11 via a reduction mechanism (not shown).

The fuel tank 3 is formed in a quadrangular shape in which a corner portion is chamfered by a curved surface when viewed from above. A horizontally projected area of the fuel tank 3 is formed to be slightly smaller than horizontally projected area of the crankcase portion 12. The fuel tank 3 is formed in a flat shape in which its height is smaller than the width and the depth. The fuel tank 3 feeds fuel by its own weight to a fuel injection device for mixing fuel air or a carburetor. In this embodiment, a carburetor 14 (see FIG. 3) is used.

The air cleaner box 4 and the muffler 5 are arranged in parallel with the fuel tank 3 in a horizontal direction. The air cleaner box 4 is disposed on a first side in a front-rear direction, and the muffler 5 is arranged on a second side opposite to the air cleaner box 4 in the front-rear direction. Like the fuel tank 3, the air cleaner box 4 and the muffler 5 are formed in a quadrangular shape in which corner portions are chamfered by curved surfaces when viewed from above.

The air cleaner box 4 incorporates an air cleaner (not shown). A carburetor 14 is arranged below the air cleaner box 4. The air cleaner box 4 removes dust or the like contained in the outside air by an air cleaner. Intake air from which dust or the like is removed by the air cleaner is supplied to the carburetor 14. The carburetor 14 is connected to an intake port (not shown) formed on the front side of the cylinder portion 10.

The air cleaner box 4 has a skirt portion 4a that covers the front side of the carburetor 14. In the skirt portion 4a, a window portion 4b for exposing an on/off switch 16 (see FIG. 1) of the engine 1 toward the front is formed. In the skirt portion 4a, a notch portion 17 is formed at an intermediate position between the fuel tank 3 and the crankcase portion 12 in a height direction. A throttle lever 18a capable of swinging left and right is disposed in the notch portion 17. By swinging the throttle lever 18a left and right, it is possible to adjust the rotational speed of the engine 1 after starting. Further, in the notch portion 17, a choke lever 18b is disposed below the throttle lever 18a to be swingable left and right.

The muffler 5 is connected to an exhaust port (not shown) of the cylinder portion 10. After reducing the exhaust noise of the engine 1, the muffler 5 discharges the exhaust air to the outside, more specifically, toward the left side.

The recoil starter 6 is attached to the front side of the crankcase portion 12. The recoil starter 6 includes a spring, a reel, a lever, a rope (none of which is shown), a housing 21, and the like.

In the recoil starter 6, a rope with a handlebar 20 attached to its leading end is wound around a reel, and when the handlebar 20 is pulled, the reel rotates. The reel is connected to the crankshaft 11 of the engine main body 2 via a lever and a flywheel. The flywheel fixed to the crankshaft 11 includes recoil claws (not shown) that permit relative rotation between the reel and the pulley in only one direction. The lever transmits the rotational power of the reel to the crankshaft via the flywheel only when the rope is pulled and the reel rotates. For example, when the user releases her or his hand from the handlebar 20, the rope is wound around the reel by the elastic force of the spring. A cooling fan (not shown) is integrally formed on the flywheel, and as the crankshaft 11 rotates, the air taken in from outside is sent as cooling air for cooling the outer peripheral surface of the cylinder portion 10.

The recoil starter 6 includes a housing 21 in which a plurality of opening portions 21a for taking in the outside air are formed. The housing 21 is attached to a fan cover 22 (see FIG. 3) that houses a cooling fan. The fan cover 22 is fixed to the crankcase portion 12.

As a result, the outside air flowing in from the opening portion 21a of the housing 21 is fed toward the cylinder portion 10 by the cooling fan inside the fan cover 22. The cooling air fed by the cooling fan performs heat exchange on the outer surface of the cylinder portion 10, cools the cylinder portion 10, and then is discharged to the outside from the rear side. In this embodiment, the housing 21 is made of a resin and the fan cover 22 is made of a metal. The recoil starter 6 is not limited to one having the aforementioned internal structure. As the recoil starter 6, those having various internal structures can be applied.

As shown in FIG. 2, the self-starter unit 7 includes a starter motor 30 and a key box 31.

The starter motor 30 performs cranking at the time of starting of the engine, in place of the aforementioned recoil starter 6. The starter motor 30 in this embodiment is a DC motor with a brush. The starter motor 30 is attached to the engine main body 2 such that its rotor shaft 32 extends in the direction of the axis O1 of the crankshaft 11 of the engine 1. More specifically, in the direction of the axis O1 of the crankshaft 11, a cooling fan is disposed on the first side of the crankcase portion 12, and the starter motor 30 is disposed on the second side of the crankcase portion 12. In other words, the starter motor 30 is disposed on the side opposite to the cooling fan across the crankcase portion 12 in the direction of the axis O1 of the crankshaft 11.

In the crankcase portion 12, a portion 12a located on the side opposite to the cylinder portion 10 across the crankshaft 11 in the horizontal direction and above the crankshaft 11 has a thickness in the depth direction thinner than the circumference of the crankshaft 11. The above-mentioned starter motor 30 is attached to a portion in which the thickness of the crankcase portion 12 is formed to be thin. Here, the starter motor 30 attached to the crankcase portion 12 is formed to have a length dimension that does not protrude toward the rear side from the end portion 12b (see FIG. 3) on the rearmost side of the crankcase portion 12. A leading end portion (not shown) of the rotor shaft 32 of the starter motor 30 meshes with a gear formed on the flywheel only when the starter motor 30 is driven. That is, by driving the starter motor 30, the power of the starter motor 30 is transmitted to the flywheel, and the engine 1 can be started.

As shown in FIGS. 1, 2, and 4, the key box 31 is attached to the fan cover 22 of the engine main body 2. More specifically, the key box 31 is attached to the engine main body 2 to be arranged on the upper side of the side surface 22a of the fan cover 22.

Figure 5:
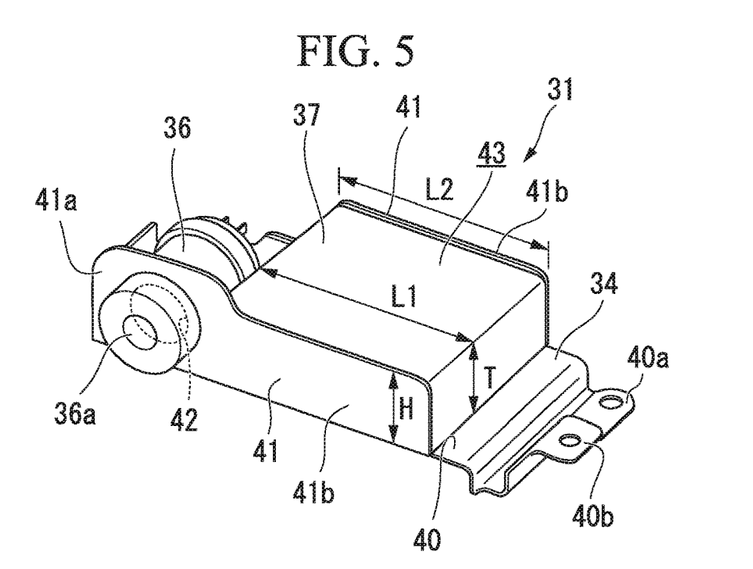
FIG. 5 is a perspective view of a state in which a cover of a key box in the embodiment of the present invention is detached.
Figure 6:
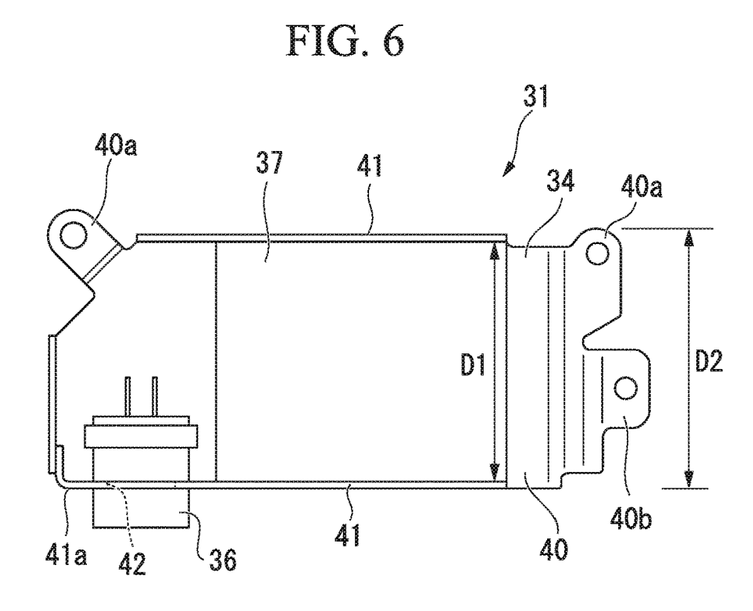
FIG. 6 is a plan view of a state in which a cover of the key box in the embodiment of the present invention is detached.

FIG. 5 is a perspective view of a state in which the cover of the key box in the embodiment of the present invention is detached. FIG. 6 is a plan view of a state in which the cover of the key box in the embodiment of the present invention is detached.

As shown in FIGS. 5 and 6, the key box 31 includes a bracket 34, a cover (see FIG. 4) 35, a key switch 36, and a battery pack 37.

The bracket 34 includes a main plate portion 40 and a side wall portion 41. The bracket 34 in this embodiment is formed of a metal plate.

The main plate portion 40 is disposed on the side of the aforementioned fan cover 22 to extend in the up-down direction of the engine 1. The main plate portion 40 has a fixing portion 40a which is fixed to the crankcase portion 12 by inserting the screw or the like. In FIG. 6, a symbol "40b" is a cover fixing portion which fixes the cover 35 with screws or the like.

The side wall portion 41 vertically stands up from the end edge of the main plate portion 40. A circular through hole 42 for fixing the cylindrical key switch 36 is formed in the upper portion 41a of the side wall portion 41 standing up from the front end edge. A manipulation portion 36a (see FIG. 5) of the key switch 36 is exposed to the front side of the engine 1 via the through hole 42.

A housing portion 43 which houses the battery pack 37 is provided in the bracket 34 at the lower portion 41b of the side wall portion 41. The housing portion 43 is formed by the main plate portion 40 and lower portions 41b of the two front and rear side wall portions 41. Here, the lower portion 41b of the front side wall portion 41 forming the housing portion 43 is formed so that its height dimension in the direction in which it stands up from the main plate portion 40 is slightly smaller than the upper portion 41a to which the key switch 36 is attached.

The key switch 36 is manipulated by a user when operating the starter motor 30. When operating the starter motor 30, the user inserts a key into the key cylinder of the key switch 36 and rotates the key in a predetermined direction. As a result, a closed circuit is formed between the battery pack 37 and the starter motor 30, and the starter motor 30 is energized. The key cylinder of the key switch 36 is urged toward the initial position at which the starter motor 30 is not operated, and after the engine 1 is started, when the user releases her or his hand from the key, the operation of the starter motor 30 is stopped.

The battery pack 37 is formed in a rectangular parallelepiped shape corresponding to the size of the aforementioned housing portion 43. The thickness dimension T of the battery pack 37 is formed to be slightly smaller than the height dimension H of the lower portion 41b of the side wall portion 41. A length dimension L1 of the battery pack 37 is formed to be equal to a length dimension L2 of the lower portion 41b of the side wall portion 41. The width dimension D1 of the battery pack 37 is formed to be equal to the width dimension D2 of the main plate portion 40.

Figure 7:
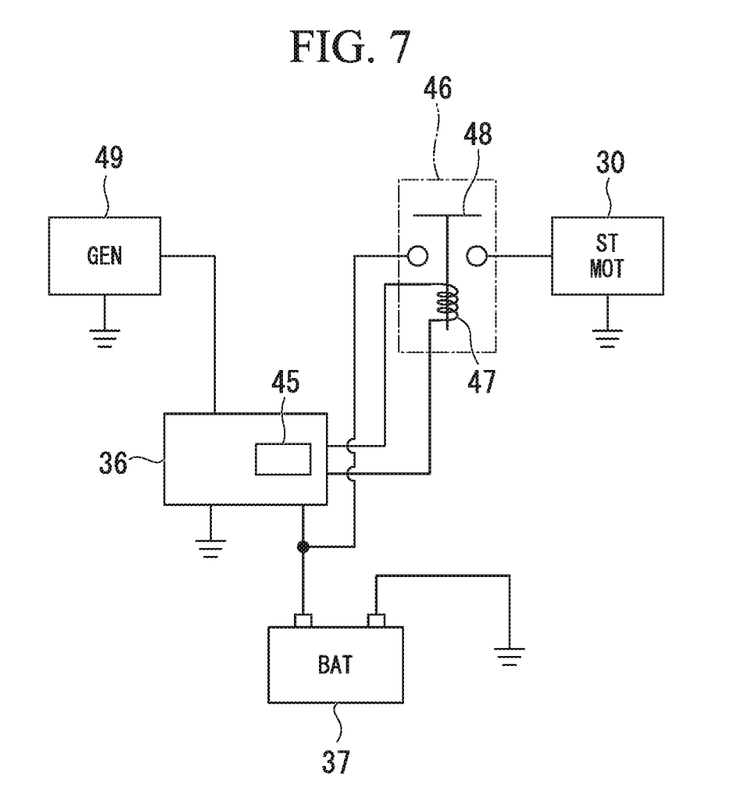
FIG. 7 is an electric circuit showing a schematic configuration of a self-starter unit in an embodiment of the present invention.

FIG. 7 is an electric circuit showing a schematic configuration of a self-starter unit according to an embodiment of the present invention.

As showing in FIG. 7, the key switch 36 includes a control unit 45. The control unit 45 controls electric power supply from the battery pack 37 to the starter motor 30. More specifically, the control unit 45 controls on/off of a relay 46 provided in the middle of the wiring which connects the battery pack 37 and the starter motor 30, thereby controlling the electric power supply to the starter motor 30. That is, the control unit 45 opens and closes a contact 48 of the relay 46 by controlling the current flowing through a manipulation coil unit 47 of the relay 46. The relay 46 in this embodiment uses a normally open contact.

A generator 49 is further connected to the key switch 36. The generator 49 is provided in the engine main body 2 to convert the rotational energy of the crankshaft 11 into electric energy.

The battery pack 37 includes a plurality of battery cells and protection circuits thereof (none of which is shown) therein. The battery cell of this embodiment includes a lithium ion secondary battery. Here, the battery cell constituting the battery pack 37 is not limited to the lithium ion secondary battery, and may be a lithium-based cell containing lithium in the negative electrode. The battery pack 37 in this embodiment uses the lithium ion secondary battery, thereby improving charge and discharge characteristics and reducing the size as compared with batteries such as nickel hydrogen secondary batteries. In FIG. 7, for convenience of illustration, a regulator provided between the battery pack 37 and the starter motor 30 is omitted.

Next, the operation of the aforementioned self-starter unit 7 will be described.

First, when the user performs a manipulation to rotate the key, the manipulation coil unit 47 of the relay 46 is energized and the contact 48 is closed. As a result, electric power is supplied from the battery pack 37 to the starter motor 30. When the user stops the key manipulation, the key cylinder returns to the initial position, the energization to the manipulation coil unit 47 is stopped, and the contact 48 is opened. As a result, the starter motor 30 is stopped. When the engine 1 is started, electric power is output from the generator 49, the electric power is supplied to the battery pack 37 via the key switch 36, and each battery cell is charged.

According to the engine 1 of the aforementioned embodiment, the engine 1 can be started by the starter motor 30, and there is no need to install a power supply such as a battery pack for driving the starter motor 30 in a device such as a working machine on which the engine 1 is mounted. By using a lithium-based cell, the size of the cell required to drive the starter motor 30 can be set to be smaller than when a lead storage battery is used. Therefore, the battery pack 37 can be miniaturized and easily attached to a dead space or the like of the engine main body 2. As a result, it is possible to easily start the engine, and it is possible to suppress a decrease in operability accompanied with an increase in the size or an increase in the weight of a device such as a working machine driven by the engine output.

Furthermore, by simply attaching and detaching the bracket 34 to and from the engine main body 2, it is possible to attach and detach the battery pack 37 to and from the engine main body 2. As a result, the battery pack 37 can be easily attached to and detached from the engine main body 2 at the time of assembly or maintenance.

Furthermore, the battery pack 37 can be disposed at the farthest position from the cylinder portion 10, which has the highest temperature in the engine main body 2. Further, together with the battery pack 37, the starter motor 30 can also be disposed at the farthest position from the cylinder portion 10. Therefore, it is possible to suppress the temperature rise of the starter motor 30 and the battery pack 37. Furthermore, it is possible to shorten the wiring through which a large current flows between the starter motor 30 and the battery pack 37, thereby reducing the resistance due to the wiring. As a result, it is possible to reduce the burden on the lithium-based cell constituting the starter motor 30 or the battery pack 37, and to stably drive the starter motor 30 with high efficiency.

Furthermore, since the key box 31 is attached to the fan cover 22 which forms a passage of cooling air and has a relatively lower temperature than other locations in the engine main body 2, the temperature rise of the battery pack 37 can be further suppressed.

Further, in the key box 31 to which the key switch 36 is attached, since the battery pack 37 is arranged below the key switch 36, it is possible to effectively utilize the space below the key switch 36.

Furthermore, the key switch 36 and the battery pack 37 can be attached to a single bracket 34. Therefore, after the key switch 36 and the battery pack 37 are integrated, the key switch 36 and the battery pack 37 can be attached to the engine main body. Further, a bracket for attaching the key switch 36 to the engine main body 2 can be commonly used as a bracket 34 for attaching the battery pack 37 to the engine main body 2. As a result, the number of components can be reduced and the mounting work can be simplified.

Further, when the starter motor 30 does not perform cranking, the wiring between the battery pack 37 and the starter motor 30 can be opened by the control unit 45. Therefore, it is possible to suppress discharge of the battery pack at times other than cranking. Further, when the battery pack 37 is charged from the generator 49 included in the engine main body 2, the charging efficiency can be improved.

Modified Example of Embodiment

Figure 8:
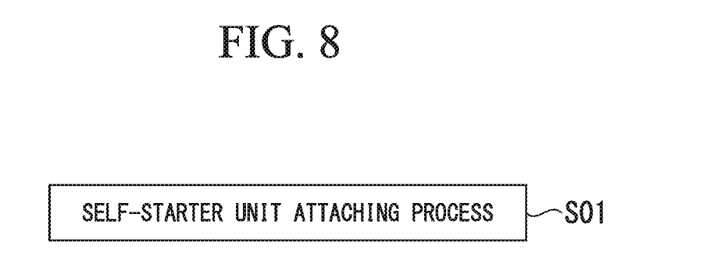
FIG. 8 is a view showing an attaching process of a self-starter unit in a modified example of the embodiment of the present invention.

In the aforementioned embodiment, a case in which the engine 1 includes the self-starter unit 7 in advance has been described. However, in the aforementioned self-starter unit 7, by causing the user to perform a self-starter unit attaching process (step S01) shown in FIG. 8 attached to an engine including only the recoil starter 6 delivered or stocked as a starting device, it is also possible to alter (modify) the specifications In this way, it is possible to easily add the cranking function of the starter motor 30 of the engine 1 to a device such as a working machine that does not have a dedicated space for installing the battery pack 37. As a result, the engine 1 can be easily started by the starter motor 30 at a normal time, while the recoil starter is maintained as a starting device for emergencies.

The present invention is not limited to the aforementioned embodiments, but includes various modifications added to the aforementioned embodiments within the scope that does not depart from the gist of the present invention. That is, the specific shapes, configurations, and the like described in the embodiments are merely examples and can be appropriately changed.

For example, in the aforementioned embodiment, a case in which the self-starter unit 7 is provided in the engine 1 in which the cylinder portion 10 is disposed to be inclined with respect to the crankcase portion 12 has been described. However, the cylinder portion 10 is not limited to the arrangement of the aforementioned embodiment. For example, the self-starter unit 7 may be applied to an engine in which the cylinder portion 10 extends in the vertical direction from the crankcase portion 12. Further, the arrangement of the fuel tank 3, the air cleaner box 4, the muffler 5 and the like is not limited to the arrangement of the aforementioned embodiment. For example, a fuel pump for sucking up fuel may be provided so that the fuel tank 3 is disposed below the crankcase portion 12.

Further, the arrangement of the self-starter unit 7 is not limited to the arrangement of the aforementioned embodiment. The arrangement of the self-starter unit 7 may be appropriately moved, depending on the arrangement of the fuel tank 3 and the like.

Furthermore, in the aforementioned embodiment, the case in which the key switch 36 and the battery pack 37 are fixed to the same bracket 34 has been described. However, the key switch 36 and the battery pack 37 may be fixed to the engine main body 2 via separate brackets.

Further, the case in which the battery pack 37 is attached to the engine main body 2 via the bracket 34 has been described. However, the invention is not limited to this configuration. For example, the battery pack 37 may be directly attached to the engine main body 2, without using the bracket 34.

Furthermore, although the case in which the battery pack 37 is disposed below the key switch 36 has been described, the battery pack 37 may be disposed in a dead space other than the lower side of the key switch 36. As long as the battery pack 37 is attached to the engine main body 2, the arrangement of the battery pack 37 is not limited to the arrangement of the aforementioned embodiment.

Furthermore, in the horizontal direction, the starter motor 30 and the cooling fan may be arranged on sides opposite to each other across the crankshaft 11. However, when there is space for arranging the starter motor 30 on the cooling fan side, the starter motor 30 and the cooling fan may be arranged on the same side.

In the aforementioned embodiment, the case in which the shape of the battery pack 37 is formed in a rectangular parallelepiped shape and the case in which the protection circuit is provided inside the battery pack 37 has been described. However, the battery pack 37 is not limited to a battery pack formed in a rectangular parallelepiped shape or a battery pack in which a protection circuit is provided.

INDUSTRIAL APPLICABILITY

The present invention is applicable to an engine, a self-starter unit, and a method for altering engine specifications. According to the engine, the self-starter unit, and the method for altering the engine specifications, it is possible to easily start the engine, and to suppress degradation in operability accompanied with an increase in the size or an increase in the weight of the device driven by the engine output.

BRIEF DESCRIPTION OF THE REFERENCE SYMBOLS

1: Engine
2: Engine main body
3: Fuel tank
4: Air cleaner box
4a: Skirt portion
5: Muffler
6: Recoil starter
7: Self-starter unit
10: Cylinder portion
11: Crankshaft
12: Crankcase portion
12a: Portion
13: Output shaft
14: Carburetor
15: Intake port
16: Switch
17: Notch portion
18a: Throttle lever
18b: Choke lever
19: Exhaust port
20: Handlebar
21: Housing
22: Fan cover
30: Starter motor
31: Key box
32: Rotor shaft
34: Bracket
35: Cover
36: Key switch
36a: Manipulation portion
37: Battery pack
40: Main plate portion
40a: Fixing portion
40b: Cover fixing portion
41: Side wall portion
41a: Upper portion
41b: Lower portion
42: Through hole
45: Control unit
46: Relay
47: Manipulation coil unit
48: Contact
49: Generator
O1: Axis

The invention claimed is:
1. An engine comprising:
a starter motor which is attached to an engine main body and is configured to perform cranking of a crankshaft;

a battery pack equipped with a lithium-based cell which is attached to the engine main body and which is configured to supply electric power which drives the starter motor; and a fan configured to supply cooling air to a cylinder portion of the engine main body and disposed on a first side of a crankcase of the engine main body in an axial direction of the crankshaft, and the starter motor is disposed on a second side of the crankcase, and the starter motor and the battery pack are disposed on an opposite side from the cylinder portion across an axis of the crankshaft.

2. The engine according to claim 1, wherein the battery pack is attached to a fan cover which covers the fan.

3. The engine according to claim 1, further comprising:

a switch unit which is attached to the engine main body and is configured to perform a starting manipulation of the engine main body, wherein the switch unit and the battery pack are attached to the engine main body via a single bracket.

4. The engine according to claim 1, wherein the battery pack is attached to the engine main body via a bracket.

5. The engine according to claim 1, further comprising:

a control unit which performs energization from the battery pack to the starter motor only when the starter motor performs cranking.

6. A method for altering engine specifications of an engine in which a fan configured to supply cooling air to a cylinder portion of an engine main body and a recoil start are disposed on a first side of a crankcase of the engine main body in an axial direction of a crankshaft, the method comprising:

attaching a starter unit to a second side of the crankcase and an opposite side of the cylinder portion across an axis of the crankshaft, the starter unit including a starter motor configured to perform cranking of the engine, a battery pack equipped with a lithium-based cell configured to supply electric power to the starter motor, and a control unit configured to control power supplied from the battery pack to the starter motor.

* * * * *